Aug. 11, 1942.  W. M. BISHOP  2,292,358
DEEP-SEA APPARATUS HOUSING
Original Filed Jan. 23, 1940
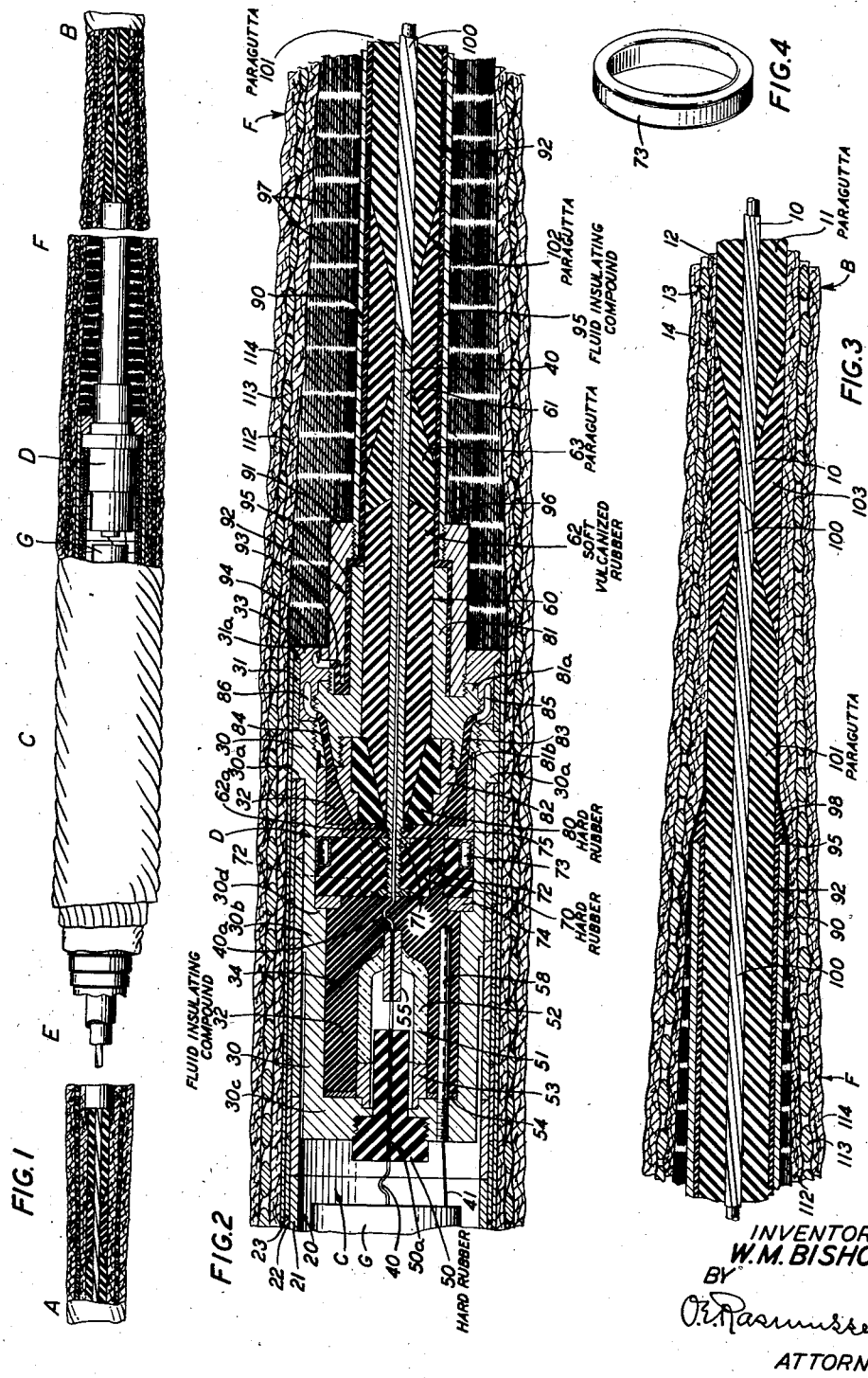
INVENTOR
W. M. BISHOP
BY
O. R. Rasmussen
ATTORNEY Patented Aug. 11, 1942

2,292,358

UNITED STATES PATENT OFFICE 2,292,358

DEEP-SEA APPARATUS HOUSING

Walter M. Bishop, Flushing, N. Y., assignor to Bell Telephone Laboratories, Incorporated, New York, N. Y., a corporation of New York Original application January 23, 1940, Serial No. 315,147, now Patent No. 2,261,613, dated November 4, 1941. Divided and this application March 15, 1941, Serial No. 383,513

8 Claims. (Cl. 174—70)

This invention relates to deep-sea apparatus housings to be connected into deep-sea cables and to be laid with the cable on the sea bottom.

This application is a division of my copending application, Serial No. 315,147, filed on January 23, 1940, and issued as Patent No. 2,261,613 on November 4, 1941.

It is a principal object of the invention to provide a deep-sea housing for electrical apparatus, which may be inserted in the cable before laying and which is so designed that it may be paid out with the cable without injury to the apparatus within the housing.

It is particularly an object of the invention to provide end glands or seals for sealing the entrance openings of the housing and for passing the conductors from the cables to the electrical apparatus in the housing, and which will effectively seal the housing and insulate the conductors for long periods of years without requiring attendance or repairs.

Inasmuch as deep-sea structures of this kind are subjected to tremendous pressures for long periods of years, it is difficult to predict at what time and at what point of the structure the inevitable first failure will occur. It is, therefore, necessary to anticipate breakdowns at different points in the structure and to as far as possible provide a second point of resistance, so that the structure may still be in serviceable condition for a time after the primary breakdown and the life of the structure thereby prolonged.

It is, therefore, a further object of the invention to provide an end seal or gland for the housing which establishes at least two barriers against ingress of sea water.

It has been a serious difficulty in the past to prevent water vapors from penetrating into or through the seals and to prevent condensation of such vapors inside the structure, with the consequence that such structures sooner or later break down as to their electrical insulating qualities. It is, therefore, a further object of the invention to provide a sealing structure for the housing which definitely prevents penetration of water vapors into the housing proper, which will oppose for long times the penetration of water vapors into the sealing structure and which will substantially prevent condensation of such vapors within the sealing structure, even under a partial breakdown of the structure.

It is a still further object of the invention to provide an insulating end seal which will be effective at low as well as at high sea pressures.

The invention is closely related to cable housings such as disclosed in the following United States patents: 2,110,457 issued to J. F. Wentz March 8, 1938, and 2,158,492 issued to W. M. Bishop May 16, 1939; and provides improvements on the structures disclosed in those patents.

Housings of this type are usually made in the form of an elongated cylindrical chamber with an impervious wall of metal sufficiently rigid to withstand the sea pressure and having an end gland at each end. The central conductor of the cable circuit is passed through a series of insulating bushings and seals of effective construction and located in the center of the end gland, and is connected to the apparatus within the housing; the return path is established by a connection from the apparatus within the housing to the outer metal parts of the gland and from there to the sea water and outer armoring.

The cylindrical housing is made sufficiently flexible to permit it to follow the curvature of the paying-out sheave on the cable ship during laying; since the housing usually has a greater diameter than the cable, a build-up or filler is provided for gradually tapering the diameter from that of the housing to that of the cable, and the outer armoring is evenly applied over the entire assemblage so that the paying-out operation may proceed smoothly.

In the patents to Wentz and Bishop, referred to above, the flexible cylindrical wall of the chamber is constructed of an inner element in the form of a helix of steel capable of withstanding deep-sea pressures and an outer element in the form of a pliable copper jacket or sheathing, impervious to water, covering the helix. Thus, the outer sheathing is supported at all points by the closely wound turns of the helix, each turn presenting a flat outer surface to the sheathing.

In accordance with a specific feature of the present invention the flexible cylindrical wall of the chamber is constructed of an inner element built up of a series of overlapping rings, preferably of steel, forming a substantially continuous tubular wall for supporting the outer pliable sheathing. This construction has certain important advantages over that using a helix. Thus the series of rings are simpler to manufacture. The rings are readily packed close together with negligible gaps between them. Due to the overlapping of successive rings the outer pliable sheathing will be supported even where it may be forced into the small gaps in the outer surface presented by the rings, which occur when the housing is flexed. In fact, by making the outer overlapping portions of the rings thin enough the displacement of the pliable covering into such gaps may be limited so that there will be no danger of rupturing the sheathing at such points. In the preferred form the supporting tube is made up of an inner layer of thick abutting rings strong enough to withstand the deep-sea pressure, and an outer layer of thinner abutting rings placed in supporting engagement with the inner layer of rings. The outer rings are displaced relative to the inner rings to cover the lines of abutment between the inner rings, and the two sets of rings act to keep each other in alinement. The pliable outer sheathing is placed in supporting engagement with the outer set of rings.

In accordance with a feature of the invention, each end gland for the housing is made up as a sealing chamber having at its inner end a substantially rigid and impervious insulating seal for the inner portion of the central conductor and having at its outer end a semirigid or semielastic insulating seal for the outer portion of the central conductor; the enclosed chamber between the two seals is filled with a fluid insulating compound.

Anticipating that water vapors sooner or later during the life of the structure may penetrate the outer parts of the end gland, the inner seal of the gland is made entirely of impervious materials so that the vapors cannot penetrate into the housing proper while the inner seal is intact. For this purpose the end gland structure is assembled mainly of metal parts, including the central conductor, which are sealed together by metallic solder after having been placed in position. The insulator between the outer main metallic structure of the seal and the central conductor is of a suitable vitreous substance, such as certain glasses particularly adapted for wet-sealing with certain metals. Thus, the inner seal is made up of impervious substances imperviously sealed together and imperviously sealed to the cylindrical wall of the housing proper.

The outer elastic seal of the end gland is designed generally along the lines of similar seals disclosed in the patents referred to above, to provide an effective insulation for the central conductor particularly adapted for joining to cable insulation. Thus, the cable insulation is terminated within the outer seal by a short length of vulcanized rubber compound vulcanized to the opposed concentric metal surfaces of the central conductor and a sleeve of the general metallic structure of the gland. With the contiguous surfaces made of brass and especially treated for the purpose, good adhesion with the rubber may be secured so that an elastic seal is formed which will definitely prevent passage of water at low sea pressures, such as are met with during the laying operation.

For the purpose of withstanding high sea pressures, the elastic compound of the outer seal is supported by a solid end piece of hard rubber having a central bore for guiding the central conductor. It has been found that water vapors, which have accidentally diffused through the vulcanized compound, tend to condense between the contiguous surfaces of the said hard rubber support and the supported elastic rubber seal; under such conditions a leakage path for electric currents between the central conductor and the metallic parts is established and it is a feature of the invention to make this leakage path reasonably long so that even in the case of such accidental diffusion the signaling over the cable will not be seriously impaired due to this cause. Thus, instead of providing the supporting end piece with a right-angle shoulder for supporting the inner end of the elastic rubber seal, as in the prior art referred to above, the supporting end piece or bushing is made with a conical bore which fits onto the tapered end of the vulcanized seal so that the seal is wedged between the tapered surface of the bore and the central conductor. By this provision the leakage path referred to may be made several times longer than with a shoulder. A metallic support is provided for the hard rubber supporting bushing to take up the high radial pressure on the conical surface of the bore. Thus, in accordance with the invention, the outer elastic seal is arranged to take up low as well as high sea pressures so that the inner rigid glass seal will not be subjected to appreciable pressure and thus may have a long life with little danger of the glass insulation cracking and becoming leaky.

As already referred to, it is important to prevent condensation of water vapors within the sealing structure in order to prevent formation of leakage paths for signaling currents. For this reason the entire space between the two seals of the end gland is filled with a liquid insulating compound which will not react with the metal parts or the insulating compounds with which it is in contact. The liquid compound wets all surfaces of the sealing chamber and, in fact, wets the small annular bead of the elastic compound which is formed when the latter under high pressure is forced slightly beyond the narrow annular passage between the central conductor and the supporting hard rubber bushing. An important feature of this arrangement is that any water vapor that may have condensed on the conical surface of the bore in the hard rubber bushing will be prevented from leaking into the sealing chamber along other adjacent surfaces which are wetted by the fluid compound.

In accordance with a feature of the invention provision is made for protecting the inner glass seal against pressures beyond a predetermined limit within the sealing chamber. The pressure within the sealing chamber may increase dangerously due to a number of causes. Thus when the housing is lowered to the sea bottom, all the parts will gradually set close together under the increasing pressure and the fluid compound entirely confined by the sealing chamber will be subjected to compressing forces. Also during this condition or due to an accidental partial breakdown of the outer seal, a portion of the vulcanized rubber compound of the outer seal may become extruded into the sealing chamber through the annular passage between the supporting bushing for the vulcanized compound and the central conductor thus tending to displace a comparatively small volume of the fluid compound confined in the sealing chamber.

Therefore a comparatively small compressible volume is established within the sealing chamber and in engagement with the fluid compound. This reserve volume is adapted to be reduced and replaced by a volume of fluid compound at comparatively low pressures, thereby affording protection for the inner glass seal at least within reasonable limits. This reserve volume may be established by the presence of a collapsible structure such as a hollow chamber offering by its design a limited resistance to its collapse or confining a volume of gas to secure a gradual compression as the pressure in the sealing chamber gradually increases within the predetermined safe limits. In the preferred form this gas chamber is of thin sheet metal hermetically sealed to prevent access of accidentally present water vapors to the interior of the collapsible chamber and thus preventing condensation.

In accordance with still another feature of the invention an outer reservoir of liquid insulating compound is provided external of the end gland and in cooperation with the outer elastic insulating seal. This reservoir, being under sea pressure, will fill accidental crevices or voids in the insulating material of the outer elastic seal. The reservoir is in the form of a long tube surrounding a portion of the cable section connected to the outer seal. The space between the cable core and the tube is filled with a liquid compound and the distant end of the reservoir is closed by a suitable sleeve which may be of rubber. With this arrangement a path which may be several feet long is provided for delaying diffusion of sea water into the sealing structure.

Thus in accordance with the invention each end gland provides a double seal, in which each seal is capable of withstanding the sea pressure for reasonably long times and retains high insulating qualities even during partial breakdown of the sealing structure. The inner seal is impervious to water vapor and since it includes a glass structure, provision is made to withhold the sea pressure therefrom by means of the outer elastic seal and provision is made to delay the appearance of an excessive pressure on the glass structure during partial breakdown of the outer seal. In addition, a reservoir of fluid insulating compound is provided to delay almost indefinitely the penetration of water vapor to the sealing chamber and to fill accidental voids in the outer seal as well as in the sealing chamber, thereby preventing condensation within these structures.

The invention will now be described more in detail as applied to a preferred specific structure and reference will be made to the accompanying drawing, in which:

Fig. 1 is a general view, partly in section, of a cable housing connected between two cable ends;

Fig. 2 is a detail view, in cross-section, of one of the end glands or seals;

Fig. 3 is a detail view, in cross-section, of the connection between the housing structure and a cable end; and Fig. 4 is a perspective view of the collapsible chamber used in the end gland.

Referring now particularly to Fig. 1, a submarine cable A is interconnected with a submarine cable B by means of a housing C and intermediate connecting cable sections E and F. A portion of the housing C is shown cut away to disclose the location of one of the two end glands D and of the apparatus G within the housing proper.

As shown more in detail in Fig. 2, the cable housing is built up of a plurality of heavy steel rings 21, set side by side to form an inner cylindrical wall; these rings are kept in mutual alignment by means of a series of outer, lighter steel rings 22 overlapping the inner rings, thereby forming the cylindrical wall 20 of the housing of sufficient strength to withstand deep-sea pressures. An outer water-impervious copper sheathing 23 is placed over the entire length of the steel wall 20 and projects a short distance beyond the steel rings at each end of the housing; the copper sheathing is thin and sufficiently pliable to slightly bend during the paying-out operation of the housing and cable. The inner rings 21 may be of sufficient radial thickness to safely withstand the deep-sea pressure on the housing, in which case the outer rings 22 need be only thick enough to withstand the strain when the inner rings become slightly separated due to flexing of the housing as during laying of the cable, and thus leave the outer rings unsupported at these narrow gaps.

The end seal or gland D comprises an end plug 30 made of brass, being generally of cylindrical shape and having an outer shoulder portion 30a for engagement with the end rings of the steel wall 20. The shoulder portion 30a has an outer diameter such that it fits snugly into the copper sheathing 23. The shouldered portion 30b of the end plug fits snugly inside the heavy steel rings 21. An end ring 31 of steel is brazed to the outer end of the plug 30 and after the end plug has been placed in position within the copper sheathing, the end ring 31 is brazed to the inside surface of the copper sheathing 23 at the point 31a, thereby keeping all the steel rings in mutual engagement and locking the end plug in position. The end plug 30 has a bottom portion 30c with an opening for an end bushing 50 of hard rubber screwed into the bottom portion 30c. The bushing 50 has a small bore 50a for passing of the central lead-out wire 40 from the apparatus G to the outer parts of the seal.

The end plug 30 forms a hollow sealing chamber 34 and contains an inner rigid seal 51 and an outer semirigid seal 60 for passage of the inner lead-in conductor 40 and the outer lead-in conducting tube 61; the sealing chamber 34 between the seals 51 and 60 has all its voids filled with a fluid insulating compound 32.

The first requirement of the inner insulating seal is imperviousness to water vapor both as regards the insulating substance proper and its sealing into the metal parts of the end gland.

It is furthermore required that the inner insulating seal be capable of withstanding the sea pressure at least for a reasonably long time, to add materially to the life of the gland even after breakdown of the outer elastic seal 60.

Glass of certain types has been found suitable for this purpose, in combination with certain metals or alloys which permit wet-sealing with the glass. Such combinations of "Kovar" metal and glass, for example, borosilicate or lead glass have been described in U. S. Patent 1,942,260 issued on January 2, 1934, to Howard Scott.

Thus a sealing element may be made by proper heat treatment of a glass tube with the "Kovar" rings or sleeves imperviously sealed thereto at opposite ends; such a sealing element thus presents metal parts for attachment to the metal parts of the end gland simply and safely by soldering. It is, of course, satisfactory to use any suitable combination of a vapor-impervious insulating substance, of sufficient strength and stability under the low temperature conditions and also under the high pressure conditions at the sea bottom, with metal capable of wet-sealing with the insulating substance without subjecting the insulating substance to damaging strain over the wide range of temperatures from those necessary for production of the seal to those existing at sea bottom.

In the present embodiment the non-impervious inner seal 51 is formed of a glass insulator

52, substantially of tubular form, the inner end of which is directly sealed to a ring 53 of "Kovar" metal which in turn is seated by a shoulder portion in the bottom part 30c of the end plug. The ring 53 is imperviously sealed to the bottom piece 30c by means of solder 54. The outer end of the glass tube 52 is reduced in diameter and is sealed directly to a sealing sleeve 55 of "Kovar" metal; the lead-out wire 40 is threaded through the small bore of the sleeve 55 and is soldered therein to form an impervious seal.

A hollow ground post 58 of copper is screwed into the bottom piece 30c and soldered thereto by means of the soldering seal 54, already referred to; the return conductor 41 from the apparatus G within the housing is threaded through the post 58 and soldered thereto at the end of the post to form an impervious seal.

The outer semirigid or semielastic seal 60 comprises a center conducting tube 61 of brass having a small bore for threading the lead-out wire 40 therethrough. About an intermediate portion of the center tube 61 there is concentrically located an outer gland tube 81 of brass having generally a cylindrical form with external shoulder portions 81a and 81b, the latter shoulder being threaded and screwed into the end plug 30. A gland bushing 80 of hard rubber is mounted in the inner end of the gland tube 81 by means of a gland nipple 82 of brass screwed into shoulder portion 81b. The gland bushing 80 has a tapered bore, the greatest diameter of which approximates the inner diameter of gland tube 81 and the smallest diameter of which is nearly the same as the outer diameter of the center tube 61, so that the bushing 80 serves to properly center the tube 61 inside the tube 81 without entirely closing the annular space between the tube 61 and the bushing 80.

The space between the brass tubes 61 and 81 and between the tube 61 and bushing 80 is completely filled with a semirigid insulating compound 62 capable of close adhesion to the contiguous brass surfaces. In the preferred form the compound 62 is of vulcanizable rubber, heat treated to be vulcanized to the brass surfaces of the tubes 61 and 81 and formed with conical surfaces protruding beyond both ends of the tube 81; the vulcanization is carried to a degree where the rubber 62 is left in an elastic state so that it may suffer small distortions under sea pressure without cracking within the body of the insulation and without breaking away from the contiguous surfaces of the seal 60. In this manner long continuous seals are provided between the center tube 61 and the insulating gland 62 and also between the gland 62 and the outer gland tube 81, which may be depended upon to exclude the sea water under low pressures due to the great adhesion that may be secured by vulcanizing rubber to properly prepared brass surfaces. The bushing 80, by virtue of its conical or tapered bore, and in conjunction with the center tube 61 provides a rigid backing for the elastic insulating gland 62 against high sea pressures without preventing some slight distortion and compression of the gland 62 in a direction toward the inner housing chamber; in fact, this construction permits the extrusion of a small annular bead 62a of the insulating material 62 on the inside of the bushing 80 under high sea pressure. The gland nipple 82 supports the hard rubber bushing 80 against rupture by the radial forces from the compound 62.

It will be noted that the inner conical surface of the bushing 80 acts as a backing for the elastic compound 62 similar to that of a right-angle shoulder. However, in case of diffusion of water vapors through the compound 62 condensation would tend to take place between the surfaces of the hard rubber bushing and the elastic compound, since these surfaces are not sealed or bonded together and thus are likely to entrap films of air. Thus a leakage path for the signaling currents will gradually be established from the center tube 61 to the outer gland tube 81. The diagonal leakage path formed by the conical shoulder within the bushing 80 would, however, be several times longer than that of a right-angle shoulder, such as shown in the prior art referred to above, and the current loss would be correspondingly smaller and in fact, can be made negligible with this construction.

For the purpose of splicing to the cable insulation 11 the outer end of the insulating gland 62 is extended by a short piece of core insulation 63 surrounding the center tube 61. This compound 63 is preferably similar to the insulating compound of the cable cores in order that it may present a surface suitable for splicing to the cable insulation; thus assuming that the deep-sea cables A and B are insulated with "Paragutta" 11 the compound 63 should preferably also be "Paragutta"; however, if the cables A and B are insulated with rubber, the compound 63 should be rubber and may thus be the same as that used in the compound 62 for the elastic part of the insulating seal.

The entire outer seal 60, composed of the center tube 61, the compounds 62 and 63, and the outer gland tube 81, may be assembled as a unit and the heat treatment of the seal may be carried out in a manner substantially as described in my Patent 2,158,492 referred to above, using the same materials as disclosed in that patent and using molds for shaping and vulcanizing the compounds 62 and 63 similar to those disclosed in that patent, but with obvious minor modifications for adapting them to the particular shapes preferred for the present invention. The surfaces of the center tube 61 and of the gland tube 81 may, however, be prepared for vulcanization of the rubber compound 62 thereto by the means and in accordance with the method disclosed in my copending patent application Serial No. 267,632, filed April 13, 1939, in order that excellent adhesion between the metal surfaces and the rubber may be more positively secured.

After the outer sealing unit 60 has been thus completed a metal spacer ring 75 is slipped over the inner end of the seal unit 60 and a center tube support 70 is attached to the inner threaded end of the center tube 61 and screwed tight against the spacer ring 75. The support 70 is in the form of a heavy, hard rubber disc having brass nuts 71 set therein for screwing onto the center tube 61; the support 70 furthermore has one or more passages 72 for providing communication between the spaces within the sealing chamber 34 of the gland D on both sides of the support.

The support 70 has a cut-out portion along its periphery for accommodation of an annular air chamber 73. The shape of this chamber is shown in Fig. 4. The chamber is preferably formed into an annular ring having a substantially rectangular cross-section; the ring is made of thin sheet metal; such as copper, enclosing an annular air-space hermetically sealed in. The shape of the cross-section of the chamber, its size and wall thickness and its internal gas pressure are determined in well-known manner by the amount of pressure the chamber is to withstand without collapsing.

A shoulder ring 74 is next placed against an inner shoulder 30d of the end plug 30 and the completed sealing unit 60 with the support 70 is then inserted and screwed tight against ring 74 by means of the threads in the outer shoulder portion 81b of the gland tube 81 and in the shoulder portion 30a of the end plug 30.

The outer end of the center tube 61 is preferably cut off at an oblique angle for joining with the adjacent connecting cable conductor 100. The lead-out wire 40 having been threaded through the center tube 61 to leave a bight 40a within the sealing chamber of the gland D, is soldered in the outer end of the bore of tube 61 and cut off, thereby forming a hermetic seal.

The end seal or gland for the other end of the housing C may be of similar construction and may be similarly assembled and placed in position in the other end of the housing as described above for the end gland D.

The connecting cable section F is in the form of a submarine cable core having a central conductor 100 surrounded by core insulation 101. The section F may conform exactly to the adjacent cable B. Thus conductor 100 may be stranded as by having a comparatively solid central strand surrounded by a plurality of outer, sector-formed strands; a layer of magnetic loading material (not shown) may be applied about the conductor 100. The core insulation 101 is preferably of the same material as that used for the core insulation of the cable section B. The connecting cable section E may be similar to the cable section F but should, of course, conform to the design of the adjacent cable A, which may or may not be the same as the design of the cable B. The length of each of the sections E and F should preferably be sufficient to facilitate splicing to the cables A and B and usually should not be less than 5 feet.

After having prepared the inner end of the cable section F for splicing, the conductor 100 is joined with the center tube 61, and the splicing compound 102 is filled into the splicing space between the insulations 63 and 101 and formed and may be cured in accordance with well-known cable practices; however, this inner connecting splice may be prepared and treated by means of the equipment for and in accordance with the method of producing a cable splice disclosed in my application for patent, Serial No. 267,632, filed April 13, 1939.

An outer connecting tube 90 having at its inner end a tube support 91 is now passed over the entire length of the insulated conductor of the connecting cable F and over the inner splice 102 and screwed into the shoulder portion 81a of the gland tube 81. The inner diameter of tube 90 is slightly larger than that of the connecting core F and the tube support 91 is dimensioned to leave an inner clearance between it and the gland tube 81 so that a continuous annular space 92 is formed about the entire length of the connecting core F. The connecting tube 90 may extend nearly to the end of the connecting core F and its wall thickness is such that it will be sufficiently pliable to readily comply with the bending of the whole cable structure as it passes over the paying-out sheave during laying operations. The outer end of the annular space 92 is closed by means of an elastic tubular sleeve 98 slipped over the outer end of the tube 90 and of the core insulation 101. A suitable material for this sleeve is "Neoprene."

The inner voids of the sealing chamber 34 in the end gland D and the outer annular space or reservoir 92 may now be filled with a non-compressible fluid insulating compound. For the purpose of filling the inner sealing chamber, two passages 83 and 84 lead from filling tubes 85 and 86 through the shoulder portion 81b of the gland tube 81 to the spaces within the end plug 30 on both sides of the center tube support 70. During the filling operation the housing structure is turned so that one of the passages, say passage 84, will be located at the highest point of the sealing chamber; air may thus readily escape therethrough and through tube 86 while compound is being supplied through the tube 85 and passage 83. The tubes 85 and 86 are shown in the drawing as being cut off to not project beyond the outer edge of the copper sheathing 23 of the housing; however, at the time of filling the chamber these tubes extend a convenient distance beyond the end of the housing so that the necessary equipment for filling may be attached thereto. After the filling operation has been completed they are cut off and folded down into the space, as shown in the drawing. The sealing chamber 34 may also be filled by applying vacuum to the upper tube 86, thereby raising the fluid compound through the lower tube 85 from a suitable container.

Thus all air pockets may be removed from the chamber 34 and by using a suitable fluid compound all surfaces would be wetted by the compound, thereby eliminating films of air on the surfaces. Thus with all air practically removed from the chamber 34 the opportunity for condensation of water vapors diffusing into the fluid compound in the chamber has been practically removed. It will be particularly noted that in this manner the formation is prevented of a short leakage path over the small inner surface of the bushing 80, and that even here the direct wetting of the annular bead 82a by the fluid compound will interrupt the leakage path, referred to above, along the conical surface of the bushing 80 and isolate it from the center conducting tube 61.

The outer annular space 92 may be filled with fluid insulating compound through the filling tube 94 and the passage 93 leading through the outer tube support 91 to the annular space 92. The tube 94 is shown in the drawing as having been shortened; however, during filling this tube also is long enough to facilitate connection to the filling equipment. During the filling operation air is permitted to escape at the outer end of the tube 90 either by leaving the elastic sleeve 98 off or in some other convenient manner. When during the filling, the filling compound overflows at the outer end of tube 90 the sleeve 98 is closed down, the filling tube 94 is cut off and bent down into the space within the edge of the copper sheathing 23, as shown in the drawing. The filling tubes 85, 86 and 94 are then sealed up by surrounding them with solder 33 and filling the free space with solder to the edge of the sheathing 23.

Thereafter a coating of copper 96 is applied to form a continuous impervious sealing surface extending a short distance over the outer surface of the end of the copper sheathing, over the surface of the solder 33, the exposed outer surface of the tube support 91 and a short distance over the outer surface of the outer connecting tube 90.

This coating or layer of copper, a few thousandths of an inch in thickness, may be applied in any convenient manner, as by spraying or by electroplating, and serves to cover the surfaces of dissimilar metals and thus to prevent electrolytic action in the presence of the sea water, the entire structure by this arrangement presenting a copper surface to the sea water. This coating also serves as an effective safeguard against sea water passing through possible flaws in the solder seal 33.

The fluid insulating compound 32 filling the sealing chamber 34 may be the same as the compound 95 in the reservoir 92. The compound should be such that it will readily flow during filling and will fill all corners of the enclosures without trapping quantities of air; thus it should also be such that it will readily wet all the interior surfaces to remove films of air therefrom. It should remain sufficiently fluid at sea-bottom temperatures to be readily redistributed in case of suddenly occurring minor defects in the seal structure. It should furthermore be such that it will not swell the rubber parts of the seal and especially the elastic vulcanized rubber seal, nor should it act to dissolve the rubber parts or to become dissolved in the rubber parts, and it should be similarly non-reacting toward the core insulations in the outer reservoir.

Suitable materials for the filling compound are certain viscous oils produced by Standard Oil Company of California and certain grades of "Vistanex" of low molecular weight produced by Standard Oil Development Company of New Jersey. "Vistanex" is a mixture of polymerized mono-olefines, chiefly ethylene, which may be produced by different methods. For information as to the composition and properties of "Vistanex" reference may be had to U. S. Patents 2,160,204 issued to Gibbons on May 30, 1939, and 2,051,840 issued to Gerhart on August 25, 1936.

The outer end of the connecting cable F and the end of cable B are then prepared for splicing. The conductor 100 and conductor 10 of the cable are then joined and splicing compound 103 supplied between the prepared surfaces of the core insulation 101 and core insulation 11 of the cable. This outer connecting splice 103 may be made by apparatus and method similar to those used in preparing the inner connecting splice 102.

The connecting cable section E is connected between the housing C and the cable A in a manner similar to that described above for the connecting cable section F.

The armoring may now be extended from the cable B to the cable A in any desirable manner.

In accordance with a preferred arrangement the large diameter of the housing is gradually reduced along the connecting cable sections E and F to the diameter of the cables A and B by means of a plurality of filler rings 97 placed in succession over the outer tube support 91 and the outer connecting tube 90; these rings have inner diameters for fitting them to the tubes 91 and 90 and have successively diminishing outer diameters to produce a smooth gradation of the outer surface of the entire structure. In the preferred form each ring 97 is made up of a spiral winding of copper tape with the required number of turns to provide the desired taper.

In accordance with the preferred arrangement the housing C and the connecting sections E and F are made up in the shop as a unit which is provided with its own armoring extending over the length of the unit. Thus an even layer of jute 112 is applied over the unit leaving free ends of the sections E and F for splicing. A layer of armor wires 113 is then applied, these wires extending beyond the ends of the unit sufficiently to provide for splicing with the armor wires 13 of the cables A and B after completion of the core splice 103 and the excess length of the armor wires being bent back from the splice in any desired manner to permit splicing of the cores. Over the armor wires the outer layer of jute 114 is applied, which is joined with the outer jute layer 14 of the cable when the splice is completed.

It will be noted that by the preferred arrangement described herein and shown in the drawing the entire housing structure presents to the sea water a copper surface which in itself is impervious to sea water and which is backed by rigid metal parts capable of withstanding deepsea pressure. The only points at variance with this general feature of the housing structure are to be found at the outer end of the outer connecting tubes 90 where the fluid insulating material 95 of the reservoirs 92 and the core insulation 100 are directly subjected to the sea pressure.

It will further be noted that by the disclosed arrangement the sealing chamber 34 is entirely surrounded by metal parts sealed together by metallic solder except for the glass insulator 52 which is effectively sealed to the Kovar metal parts 53 and 55. Thus the lead-out wire 40 is soldered to the Kovar sleeve 65, the Kovar sealing ring 53 is soldered to the end plug 30 which in turn is soldered to the gland tube 81 by means of the soldering 33, and the leading-out wire 40 is soldered at the outer end of the center tube 61.

The only exception to this metallic sealing of the sealing chamber 34 is found in the insulating gland 60. The semirigid insulating gland 62 being vulcanized to the opposing surfaces of the center tube 61 and the outer gland tube 81, is entirely effective at lower sea pressures. At higher sea pressures the pressure is exerted through the outer reservoir 82 of fluid insulation 95 upon the insulating gland 62 and the gland is subject to a slight displacement toward the center of the housing. The pressure of this displacement is taken up in the annular space between the gland bushing 80 and the center tube 61; however, under high pressure a small portion of the metallic insulating material 62 may be forced through the narrow annular space between the bushing 80 and the center tube 61 to come into engagement with and tend to compress the fluid insulating material 32 which completely fills the sealing chamber 34.

In the case of a breakdown at some point in the seal between the insulating material 62 and the contiguous surfaces, the fluid insulating material 95 is forced in from the reservoir 92 to fill any voids that may have formed, thereby effectively preventing sea water from entering the seal.

However, in the case of a gradual breakdown of the seal 60 along the surfaces of the elastic insulation 62 and the consequent penetration of the fluid insulating material from the reservoir 92 part way into those sealing surfaces, the elastic compound 62 would give under the high sea pressure and the pressure in the sealing chamber 34 would increase. When the pressure in sealing chamber 34 increases beyond a predetermined limit the gas-filled chamber 73 will begin to collapse. This collapse will continue until a balance is reached within the insulating seal 60 between the sea pressure through reservoir 92 and the increasing elastic stress in the insulating gland 62 backed by the slight, increasing gas pressure in chamber 73 acting through the fluid compound 32 upon the gland 62 at the point of the enlarged bead 62a. By proper design of the air chamber 73 the increase in its internal gas pressure even at complete collapse may be made comparatively small, so that the strain will be taken up almost entirely by the distortion of the elastic compound 62. Thus in case of a slow breakdown of the seal 60 the pressure in the sealing chamber may for long periods of time be kept within such limits as will protect the glass seal 52 against being crushed, and the life of the housing structure may thus be greatly prolonged.

As the chamber 73 collapses the thin wall may be ruptured thereby placing the enclosed gas in direct contact with the fluid compound 32. By such time as water vapors may have penetrated to the chamber 34 condensation would take place at the surface of fluid compound 32 which is in contact with the gas, and will continue to take place until a balance has been reached between the vapor pressure and the gas pressure at the prevailing temperature range. Thus an appreciable volume of water, less than that of chamber 73, would be deposited at the bottom of the sealing chamber 34. However, the dimensions within the sealing chamber 34 are sufficiently large to permit the presence of such a limited quantity of water therein without danger of establishing a leakage path or a short circuit for the signaling currents.

Whereas the invention has been described above and illustrated in the drawing as a specific preferred embodiment, it should be understood that the general features and principles of the disclosed arrangement may be incorporated in other embodiments particularly adapted for cables and housings of different types and dimensions without departure from the spirit of the invention.

What is claimed is:

1. A deep-sea apparatus housing comprising a cylindrical wall member and two rigid impervious end-wall members for closing the ends of said cylindrical member, said cylindrical member including a series of successively overlapping rings for forming a tube capable of withstanding the sea pressure and an outer thin hermetical tubular metal sheathing extending over said rings and hermetically sealed at both ends to said end-wall members.

2. A deep-sea apparatus housing comprising a cylindrical wall member and two rigid end-wall members for closing the ends of said cylindrical wall member, said cylindrical wall member including a series of successively overlapping rings forming a substantially continuous tube capable of withstanding the sea pressure and an outer thin tubular impervious metal sheathing extending over said rings and supported thereby, said sheathing being imperviously sealed at both ends to said end-wall members.

3. A deep-sea apparatus housing in accordance with claim 2 in which said series of rings comprises a plurality of rings alined to present a substantially continuous smooth cylindrical surface for support of said sheathing.

4. A deep-sea apparatus housing in accordance with claim 2 in which said series of rings comprises a plurality of metal rings of which any two immediately successive rings are overlapped to mutually maintain each other in alinement.

5. A deep-sea apparatus housing in accordance with claim 2 in which said series of rings comprises a plurality of abutting rings forming an outer continuous tube in supporting engagement with said sheathing and a plurality of abutting rings forming an inner continuous tube in supporting engagement with said outer tube of rings.

6. A deep-sea apparatus housing in accordance with claim 2 in which said series of rings comprises a plurality of abutting rings forming an inner continuous tube capable of supporting said sheathing against the sea pressure and a plurality of abutting rings forming an outer continuous tube in fitting engagement between said sheathing and said inner tube of rings, the rings in said outer tube being displaced relative to the rings of said inner tube to cover the annular lines of abutments between the said inner rings.

7. A deep-sea apparatus housing comprising a cylindrical wall member and two rigid end-wall members for closing the ends of said cylindrical member, said cylindrical member including an outer thin hermetic tubular metal sheathing and a series of successively overlapping rings placed within said sheathing to support said sheathing against sea pressure and to form a flexible tubular wall therewith, and said end-wall members being rigid and impervious and having shoulder portions for receiving the end rings of said series of rings for support by said series of rings against sea pressure on said end-wall members, and said end-wall members being hermetically sealed into said metal sheathing.

8. A flexible deep-sea housing for electrical apparatus connected into an armored cable which comprises a hollow cylindrical member and two rigid cable-end seals adapted for closing the ends of said cylindrical member and for hermetically sealing the cable conductors into the ends of said housing for connection with said apparatus, said cylindrical member including an outer thin hermetic tubular sheathing of material resistant to attack by sea water and a series of successively telescoped rings placed within said sheathing to form a flexible tubular wall therewith and adapted to support said sheathing against sea pressure, and said cable-end seals having shoulder portions for support against the ends of said series of rings under sea pressure and being hermetically sealed into the end portions of said sheathing, said housing also comprising an external layer of armoring strands extending longitudinally of said housing for splicing to the cable armorings to relieve the cylindrical member of longitudinal strain during laying of the housing with the cable and to hold said rings in their telescoped relation.

WALTER M. BISHOP.